US012782105B2

(12) United States Patent
Daemmer et al.

(10) Patent No.: US 12,782,105 B2
(45) Date of Patent: Nov. 3, 2026

(54) METHOD AND DEVICE FOR DETERMINING A PISTON OR WHEEL POSITION

(71) Applicant: Festo SE & Co. KG, Esslingen (DE)

(72) Inventors: Gabriel Daemmer, Esslingen (DE); Daniel Klassen, Esslingen (DE); Holger Bohm, Donzdorf (DE); David Rager, Nuertingen (DE); Martin Klosok, Waiblingen (DE); Daniel Lanzinner, Constance (DE)

(73) Assignee: Festo SE & Co. KG, Esslingen (DE)

( * ) Notice: Subject to any disclaimer, the term of this patent is extended or adjusted under 35 U.S.C. 154(b) by 209 days.

(21) Appl. No.: 18/890,129

(22) Filed: Sep. 19, 2024

(65) Prior Publication Data

US 2025/0130035 A1 Apr. 24, 2025

(30) Foreign Application Priority Data

Sep. 27, 2023 (DE) ..................... 10 2023 126 240.8

(51) Int. Cl.
*G01B 7/30* (2006.01)
*B25J 15/06* (2006.01)

(52) U.S. Cl.
CPC ............ *G01B 7/30* (2013.01); *B25J 15/0616* (2013.01)

(58) Field of Classification Search
CPC ............................... G01B 7/30; B25J 15/0616
See application file for complete search history.

(56) References Cited

U.S. PATENT DOCUMENTS

2018/0087544 A1* 3/2018 Magaribuchi ........... F16H 19/04

FOREIGN PATENT DOCUMENTS

| | | | |
|---|---|---|---|
| DE | 102019116517 | A1 | 12/2019 |
| DE | 102019213909 | B4 | 4/2021 |
| DE | 102022108940 | B3 | 8/2023 |
| WO | 2017059839 | A1 | 4/2017 |

* cited by examiner

*Primary Examiner* — Jennifer Bahls
*Assistant Examiner* — Adam S Clarke
(74) *Attorney, Agent, or Firm* — SLEMAN & LUND LLP

(57) ABSTRACT

A method and device for determining a piston or wheel position in a pneumatic drive and/or gripper system, comprising a wheel/piston arrangement which has a wheel and a piston coupled to the wheel. The method for determining a piston or wheel position in a pneumatic drive and/or gripper system may have a plurality of steps. In a first step, a defined system stimulus of the pneumatic drive and/or gripper system is triggered. In a further step, a system response of the pneumatic drive and/or gripper system is detected as a reaction to the defined system stimulus. Furthermore, it is provided that a parameter dataset is received. Furthermore, the piston or wheel position is determining by performing a position calculation prescription, on the basis of the detected system response, using the received parameter dataset and a comparison against the periodic, non-unique angle-of-rotation signal.

20 Claims, 8 Drawing Sheets

METHOD AND DEVICE FOR DETERMINING A PISTON OR WHEEL POSITION

RELATED APPLICATIONS

This application claims priority to DE 10 2023 126 240.8, filed on Sep. 27, 2023, the entirety of which is hereby incorporated by reference.

FIELD

The present disclosure relates to a method for determining a piston or wheel position. The disclosure further relates to a device for determining a piston or wheel position and to a pneumatic drive and/or gripper system, to the use of the determined piston or wheel position in a drive and/or gripper system and to a computer program.

BACKGROUND

Pneumatic drive and/or gripper systems, such as rotary drives and parallel grippers, are known in the art. If pneumatic parallel grippers are used, synchronous movement of the gripper jaws is forced in particular by using a gearwheel. A drive or gripper requires at least one piston to function. In a pneumatic rotary drive, the wheel may be formed as a drive shaft and/or drive element driven by at least one pneumatic piston. In the present wheel/piston arrangement, there is kinematic coupling between the linear movement of the piston and the rotary movement of the wheel. A covered displacement x can therefore be expressed as a function of an angle of rotation q and vice versa ($x=f(\varphi)$; $\varphi=f(x)$).

In various applications (pre-positioning a gripper or positioning a pneumatic robot joint), exact knowledge of the piston position and/or the angular position of the wheel is required. As a result of the kinematic coupling between the piston and the wheel (in particular gearwheel), the angle of rotation $\varphi$ of the wheel or the piston displacement x can be determined.

The position of a pneumatic piston in a cylinder can be determined by various methods without a position sensor being required. Methods for determining position without a position sensor are generally relatively imprecise or cannot provide the necessary precision for servo-pneumatic applications. These methods without the use of a position sensor can be subdivided into 1. model-based methods (DE 10 2019 213 909 B4) and 2, methods with a (reversed) assignment of a system response to the position via lookup table or formula (in other words non-model-based methods), a system stimulus being required in each case. Accordingly, even model-based position determination may also be imprecise. Typical values of the position or the precision of the position determination cannot be specified precisely enough, since they are heavily dependent on the system involved. Furthermore, in the case of model-based determination of the approximate position, potential model errors affect the calculated position error, and make further use of the position information more difficult. Furthermore, the position of the pneumatic piston in a cylinder may be determined directly, but this also requires differently configured (linear) measurement systems for differently configured cylinders (for example diameter, stroke), and thus has the drawback that many different measurement systems have to be kept available. Furthermore, configuring the measurement system for the largest configuration of the cylinder may lead to oversizing when small cylinders are used.

If the gearwheel and its position are queried directly, other drawbacks may occur for the application. Depending on the cylinder stroke and the gearwheel diameter, the gearwheel may rotate multiple times over the whole cylinder stroke. If a cost-effective single-turn magnetic field sensor element is used, the piston position can no longer be determined unambiguously from the sensor signal (the sensor signal has a period of 360°). Therefore, a much more technically complex, more expensive solution is necessary (for example a multi-turn rotary encoder with optical or magnetic coding, power supply via auxiliary battery for storing the absolute position). Alternatively, a reference pass is necessary after a system restart.

A reference pass (describing passing into the end positions) can generally be disadvantageous. In the case of a pneumatic gripper, said gripper needs to be opened or closed. This can lead to loss of a workpiece, pose a risk of injury, increase the time before usability and/or impede correct position determination if the end position cannot be reached (for example being blocked by an object). In the case of a pneumatic rotary drive, used as a robot joint, the entire downstream kinematics may have to be moved, and this can result in similar drawbacks. In addition, collisions may occur, and will result in damage to the drive/gripper.

SUMMARY

Against the background of this prior art, the object of the present disclosure is to set out means, in particular a device and/or a method, each suitable for enhancing the prior art. In particular, a compact (independent of the maximum stroke) and cost-effective means is to be provided with which exact position determination and/or angle determination is possible. This is in particular to be the case after a power-off/system restart and without a reference pass (teach-in pass).

The object is achieved by the features of the independent claims. The dependent claims each contain optional developments of the disclosure.

In one aspect, the object is achieved by a method for determining a piston or wheel position in a pneumatic drive and/or gripper system. The drive and/or gripper system has a wheel/piston arrangement. The wheel/piston arrangement has a wheel and a piston coupled to the wheel.

The method may comprise the following method steps:

- triggering a defined system stimulus of the pneumatic drive and/or gripper system and detecting a system response as a reaction to the triggered defined system stimulus;
- detecting an angle of rotation of the wheel of the wheel/piston arrangement as a periodic, non-unique angle-of-rotation signal by means of a sensor unit, in particular an angle-of-rotation sensor, in particular a single-turn magnetic field sensor;
- receiving a parameter dataset, comprising data which enable assignment of the system response detected in each case to a non-periodic, unique angle-of-rotation signal of the wheel of the wheel/piston arrangement;
- determining the piston or wheel position, as a result, by performing a position calculation prescription, a unique angle of rotation being determined from the detected system response and the received parameter dataset as an intermediate result, in particular an imprecise intermediate result, and the intermediate result being compared against the periodic, non-unique angle-of-rotation signal of the sensor unit.

In other words:

1. In a first step, a defined system stimulus of the pneumatic drive and/or gripper system is triggered and a system response is detected as a reaction to the defined system stimulus. Preferably, the unique but imprecise angular position is determined from the system response (in a downstream step).
2. In a further step, which may also be carried out before the preceding one, an angle of rotation of the wheel of the wheel/piston arrangement is detected as a periodic, non-unique—but in particular precise—angle-of-rotation signal of a sensor, in particular an angle-of-rotation sensor (for example a single-turn magnetic field sensor).
3. In a further step, which may also be carried out before one of the preceding steps, a parameter dataset is received. The parameter dataset is formed in such a way that in each case it enables assignment of the system response detected in the first step to a non-periodic, unique angle of rotation (angle-of-rotation signal). The parameter dataset may for example be generated from a model or from a stored lookup table. The lookup table may be created from previous or historic reference passes and from the system response detected during them.
4. In a further step, the piston or wheel position, in particular a unique, precise piston or wheel position, is determined by performing a position calculation prescription, a unique but imprecise angle of rotation being determined from the system response detected in step 1 and the parameter dataset received in step 3 as an intermediate result, and this intermediate result subsequently being combined with or compared against the periodic, non-unique (but in particular precise) angle-of-rotation signal from step 2, so as to provide a result. The result comprises the determined unique, precise piston or wheel position.

The result comprises the determined piston or wheel position. The determined piston or wheel position is advantageously unique and precise. In this context, "precise" means in accordance with the measurement precision of the senor unit used, and in particular as precise as a (simple) single-turn sensor (for example a single-turn magnetic field sensor).

The detected system response preferably serves to determine a non-periodic, unique but imprecise angle-of-rotation signal.

With the proposed solution, it becomes possible to provide a precise result even though the system response is imprecise. It is also possible to provide a unique result (unique even over multiple rotations) even though only one sensor is used and does not measure uniquely and thus delivers the same signals over multiple rotations.

The non-periodic, unique angle of rotation (or angle-of-rotation signal) can be determined by assigning the system response to a defined stimulus, detected in step 1, to a system state, in particular a position. This takes place in the final step, namely performing the position calculation prescription.

The received parameter dataset comprises data which enable assignment of the received system response to a non-periodic, unique angle-of-rotation signal (in particular position). This may be a lookup table. The data in the lookup table may come from previous reference passes or calculations using the model equations.

Alternatively, calculating the unique position using a model equation may also only be part of the final step (performing a position calculation prescription). In this case, the received parameter dataset may only contain the model equation itself, thus without numerical values.

Within the meaning of the present disclosure, a piston or wheel position means the position of the wheel or piston in a pneumatic drive system or pneumatic gripper system. In a pneumatic drive or gripper system, pistons and wheels are used as part of the drive mechanism to generate a rotational and/or linear movement. Compressed air can move a piston within a pneumatic cylinder. The movement direction and speed generated by the drive may be influenced by the position of the piston. Therefore, precise monitoring and/or determination of the piston or wheel position is required so as to ensure precise control or regulation of the drive.

Within the meaning of the present disclosure, two different angle-of-rotation signals are detected.

The first angle-of-rotation signal may be or comprise a periodic and thus non-unique angle-of-rotation signal. In the following, the term "first angle-of-rotation signal" may be understood to mean a periodic, non-unique angle-of-rotation signal. The periodic, non-unique angle-of-rotation signal may preferably be measured using a sensor. A periodic, non-unique angle-of-rotation signal may be understood to mean an angle-of-rotation signal which is not unique over multiple rotations, in particular of a gearwheel. If a suitable, precise sensor system is used, the first angle-of-rotation signal may be very precise, but not unique over multiple rotations. It can therefore be understood as a relative signal. The periodic, non-unique angle-of-rotation signal may preferably be detected using a single-turn sensor, in particular a single-turn magnetic field sensor. The periodic, non-unique angle-of-rotation signal is a precise (exact) signal.

A second angle-of-rotation signal may be determined as a system response to a (defined) system stimulus. Alternatively or in addition, the second angle-of-rotation signal (or angle of rotation) is preferably detected without a sensor. The system response is preferably position-dependent. A second angle-of-rotation signal may be detected/determined from a parameter dataset. This parameter dataset may for example be created via a reference pass (teach-in pass). The parameter dataset may comprise the second angle-of-rotation signal, which may be a non-periodic, unique angle-of-rotation signal, which may also be referred to as a second signal.

A non-periodic, unique angle-of-rotation signal may be understood to mean an angle-of-rotation signal which is unique over multiple rotations, in particular of a gearwheel. This second angle-of-rotation signal is typically imprecise, but unique over multiple rotations. It can therefore be understood as an absolute signal.

Within the meaning of the present disclosure, a pneumatic drive system is understood to mean a pneumatic rotary drive. Alternatively, an electric rotary drive may be used. So as to be able to drive a machine or installation, by way of example a pneumatic rotary drive may be driven using compressed air so as to rotate a wheel and optionally a shaft. The rotary drive may consist of a cylinder in which there is a piston which rotates the wheel and optionally the shaft. The compressed air is passed into the cylinder, resulting in the piston moving and rotating the wheel and the shaft. The compressed air supply path may be controlled via a control valve. The valve can regulate the airflow and thus controls the rotation of the rotary drive. The piston can move in the cylinder when compressed air flows through the valve, causing the wheel and the shaft to rotate. A pneumatic drive system can provide a cost-effective, reliable option for moving machines and installations.

Within the meaning of the present disclosure, a pneumatic gripper system is understood to mean a type of pneumatic drive system, which uses compressed air to move a gripper device and thus to grip and hold objects. The gripper system may consist of a cylinder in which a piston, which controls the gripping device, moves. When compressed air is passed into the cylinder, the piston can move, causing the gripping device to close and grip the object. The gripping device opens when the compressed air is discharged, and the object can be released. A control valve may be used to regulate the airflow into the cylinder, regulating the movement of the piston and of the gripping device.

Within the meaning of the present disclosure, a wheel/piston arrangement is understood to mean a type of drive system which converts rotation (rotary movement) into a linear movement or vice versa. The system consists of a piston which moves in a cylinder and is kinematically coupled or connected to a wheel (in particular a gearwheel). When the wheel rotates, the piston moves forwards or rearwards in the cylinder, depending on the direction of rotation of the wheel. When the cylinder moves forwards or rearwards in the cylinder, the wheel moves left or right, depending on the linear movement of the piston. The movement of the piston can be used to drive other appliances or machines, or conversely the linear movement of the piston can be converted into the rotary movement of the wheel. The wheel may be connected to a shaft to drive appliances or machines. In one configuration, the wheel may be formed as a gearwheel. The piston may have a toothed rod which enables kinematic coupling (mutual engagement of the teeth) with the gearwheel. When the cylinder moves, its movement is transmitted to the gearwheel via the kinematic coupling. Alternatively, the kinematic coupling may be established via a frictional connection and/or magnetic coupling instead of via toothing.

Within the meaning of the present disclosure, the angle of rotation of the wheel is understood to mean a measure of the rotary movement performed by said wheel. The angle of rotation may be measured and displayed or outputted in degrees or radians. The angle of rotation can specify how far the wheel has rotated from its original position. The angle of rotation may be 360 degrees or $2\pi$ radians (rad). An angle of 90 degrees may correspond to a quarter turn, while an angle of 180 degrees may correspond to a half turn.

Within the meaning of the present disclosure, the sensor unit is understood to be a device formed for detecting and measuring physical variables such as temperature, pressure, speed, humidity, movements, positions and/or other properties. The sensor unit may consist of one or more sensors. Further, the sensor unit may comprise a processing unit, an interface and a power supply. The sensor in the sensor unit can convert the measured physical variable into an electric signal (sensor signal) which is subsequently processed by the processing unit. The processing unit can filter, amplify, digitise the signal and/or convert it into another type of signal which can be interpreted by other appliances or systems. The output signal of the sensor unit may be a voltage, a current as an analogue signal or a digital signal, which can then be passed on to another appliance or system. The processing unit may comprise an analogue-digital converter. Further, the sensor unit may be formed to provide exclusively a sensor signal which is processed by a further, external processing unit. In a simple configuration, the sensor unit may comprise at least one sensor, in particular at least one angle-of-rotation sensor, more preferably at least one single-turn magnetic field sensor. The at least one sensor is formed to supply a signal for the angle of rotation which is precise but not unique over multiple rotations. For simplicity, in the present disclosure, the term "sensor" is understand to mean the sensor unit comprising a sensor.

Within the meaning of the present disclosure, a positioning prescription is understood to mean a digitally implemented instruction or rule describing how a particular position of an object or system can be achieved. The positioning prescription may be expressed as mathematical equations or as code in a programming language. The positioning prescription may describe how a particular position can be achieved.

The position calculation prescription may for example be implemented as a function in hardware and/or software, and/or provides data-driven, computer-assisted calculation of a result. The position calculation prescription is a method for calculating or providing the result, in particular the determined unique, precise piston or wheel position. A detected system response, a received parameter dataset and a sensor signal of a sensor (or sensor unit), in particular of a simple single-turn sensor, in particular single-turn magnetic field sensor, serve as input variables for the position calculation prescription. As an output variable, the result is provided in the form of a unique, precise piston or wheel position.

From the detected system response, a position or an angle of rotation can be calculated. This can be achieved by performing the position calculation prescription and/or by applying model equations and/or by accessing previously stored assignment values of a lookup table. The aforementioned alternatives may also be applied in combination, so as to provide an additional verification step to increase the quality of the provided result.

The aforementioned method thus has a range of advantages. Among other things, the advantages of two measurement/evaluation methods, which can be implemented more precisely and efficiently, can be combined into one position determination procedure. In addition, the technical complexity of the position determination is lower and more cost-effective as a result of fewer technical components being used. Furthermore, by contrast with the individual methods, as a result of the combination according to the invention a reference pass can be omitted, and this eliminates further sources of error and increases the precision of the sensor measurement. Thus, no reference pass is necessary if a single sensor is used, making it possible to reduce cycle times and to avoid potential errors and/or faults. Furthermore, a complex, expensive multi-turn rotary encoder can be omitted. Thus, the drawbacks associated with a reference pass and with the use of a multi-turn rotary encoder are also eliminated, whilst the position determination remains precise.

In the following, possible embodiments of the above-described method are explained in detail.

It may be provided that the parameter dataset is received via an input interface. The device and in particular the computing unit may include an input interface. Thus, within the meaning of the present invention, the input interface may be part of the disclosed computing unit, which can make it possible to input data and/or commands. The input interface may, alternatively or in addition, serve as an interface between the user and the computing unit, and allows the user to input information which the computing unit receives for further processing. Various types of input interfaces (keyboard, mouse, microphone) may be provided. Via the keyboard, a user can input letters, numbers and other symbols. Via a mouse, a user can move a cursor on an application surface, displayed on an output medium, and perform actions by selecting corresponding programs by clicking and double-clicking. Via a microphone, acoustic commands and information can be detected, which are converted into digital data for further processing. Furthermore, a touchscreen may be provided as an input interface, at which the user can touch the screen directly with his fingers or a stylus so as to perform actions and/or provide data. The input interface can allow a user and/or an external appliance to interact with the computing unit, the inputted signals or data then being processed by the hardware and/or software of the computer or computing unit.

It may be provided that the parameter dataset is read out from a storage unit. The disclosed computing unit may have an interface to a storage unit. The storage unit may be a component of the computing unit which is formed to store data or information permanently or temporarily. The storage unit may comprise hard disk drives (HDDs), solid-state drives (SSDs), random access memory (RAM), USB sticks and/or CD and DVD drives. The storage unit may be formed separately from the computing unit and communicate with the computing unit via a communication medium and the interface. The parameter dataset may be provided via the storage unit and read out, and optionally an updated version of the parameter dataset may be stored on the storage unit.

It may be provided that the method comprises further method steps. In a further method step, the determined piston or wheel portion may be provided and/or outputted. The piston or wheel position may be provided for use for further systems and/or devices; in particular, the determined piston or wheel position may be used to regulate or control the drive and/or gripper system. In addition, the piston or wheel position may be outputted via a user interface (screen display).

The sensor unit serves to detect the sensor signal, and may be formed to detect the angular position (angle of rotation) of the wheel. The sensor unit may interact with a magnet and in particular be formed as a magnetic field sensor and further in particular as a single-turn magnetic field sensor. It may be provided that the detected angle of rotation of the wheel is a periodic sensor signal, in other words a signal which repeats at regular intervals (per rotation) and is thus no longer unique over multiple rotations. The signal may take on various forms, for example sinewaves or rectangular or triangle-based shapes. For analysing and processing periodic sensor signals, various techniques and means may be used, including Fourier transforms, filtering and statistical methods. The means may be implemented and used in a signal processing software. Processing of the periodic sensor signal may be used to detect patterns and trends, to identify errors or discrepancies and to control systems. The signal progression can encode information on the number of rotations of the wheel.

It may be provided that the sensor unit comprises at least one single-turn rotary encoder. A single-turn rotary encoder may be a rotary encoder which can detect a complete rotation of the wheel or of a shaft and output a single value or a position as an output signal. The value may be outputted as a digital signal or analogue signal. An advantage of the single-turn rotary encoder may be that, because of its simpler construction and smaller size, it is more cost-effective than a multi-turn rotary encoder. Also, since only a complete rotation needs to be detected, less storage space is needed for processing the data, and it is also easier to integrate and calibrate. A single-turn rotary encoder can be faster and more precise than a multi-turn rotary encoder, since it is limited to a single rotation and thus has a lesser susceptibility to errors. Using a single-turn rotary encoder thus makes the system lower-maintenance. In addition, the implementation can be simplified.

It may be provided that the sensor unit interacts with a magnet. The magnet may be formed in such a way that upon rotation it generates a rotating magnetic field, which can be sampled as a periodic signal. The period may be 360°. Alternatively, the period may be 180° (for example for a magnet magnetised N/S/N/S).

The magnet may have diametric or multipole magnetisation. A diametric magnet is a magnet, in particular permanent magnet, whose magnetic field axis extends perpendicular to the magnetisation direction and is thus orientated along the diameter of the magnet. The magnet has two magnetic poles located on opposite sides of the magnet. In particular, this may be a diametrically magnetised ring magnet or cylinder magnet. Diametrically magnetised magnets may be used in applications where linear or rotational movement is to be detected or generated. They may be used in magnetic incremental encoders to detect movement of rotating shafts or linear motors or in stepper motors to generate the movement. A multipole magnet is a magnet having a plurality of magnetic poles. By contrast with diametric magnets, which only have two poles, multipolar magnets may have more than two poles. The magnetic fields of the individual poles may be arranged either to attract or to repel one another. A strong, precise magnetic field can be provided, which is capable of exerting large forces and controlling precise movements. They also have the advantage of being able to generate a more homogeneous magnetic field.

It may be provided that the position calculation prescription comprises a first formula 1:

$$\{\varphi = F(u, n) = k * u + n * 360°\}$$

where k denotes the relationship, in particular the linear relationship, between the wheel rotational position φ in degrees and the sensor signal, the sensor signal being represented as u in the formula, n representing the number of completed rotations of the wheel, and it being possible to determine n from the parameter dataset. The angular position is dependent not only on the sensor signal, but also on the number of already completed rotations (n), and this is what actually makes the present invention necessary in order to be able to provide a unique result even over a plurality of rotations.

For the provided sensor signal (sensor voltage), the angle of rotation or the piston position (determined) can be determined uniquely using the information on the number of rotations of the wheel since it left the end/zero position.

It may be provided that in a drive and/or gripper system the piston position is determined by performing the position calculation prescription, the position calculation prescription comprising a second formula 2:

$$\{x = (\pi \cdot D/360°) * \varphi\}$$

where x denotes the piston position, D denotes the effective diameter of the wheel, and φ denotes the wheel rotational position in degrees. From the determined angle of rotation, the translational piston position can be determined. The disclosed method can thus be used to determine the piston position.

It may be provided that the parameter dataset includes parameters of the piston of the wheel/piston arrangement of the pneumatic drive and/or gripper system, comprising at least an operating state, actuation signals, working volumes, working pressures and/or geometry of the piston. Within the meaning of the present disclosure, a parameter dataset is understood to mean a digital collection of numerical variables or values which describe specific settings, configurations or properties of a system, a subsystem or a device. A parameter dataset may be used to specify, control and/or optimise the functionality of systems or processes. A parameter dataset may be stored in a database or in a file, and may be read and/or processed by programs or applications so as to achieve a desired functionality. A parameter dataset of a pneumatic drive may include information on the settings and properties of the drive system. Furthermore, the parameter dataset may include settings and properties of the components of the drive system, in particular those characterising the functionality of the drive system. The parameter dataset may comprise parameters for the compressed air supply (for example pressure level and/or manner in which the compressed air needs to be provided). The parameter dataset may comprise a parameter for the piston diameter and/or a stroke length of the piston and/or a work speed (speed of the piston in the cylinder) and/or a restoring force. Furthermore, the parameter data set may comprise a seal type. The seal type, as a parameter of the cylinder, describes the type of seal which can be used in the drive to prevent compressed air escaping and performance losses being caused. The parameter dataset may include specifications as to the external and internal geometry of the cylinder as well as the geometry of the piston. Furthermore, details on the system for pneumatic compressed air supply as well as the actuation and control of the compressed air may be provided. Furthermore, details on further components of the drive and/or gripper system may be provided. Furthermore, the number of rotations of the wheel achieved for a particular parameter state of the cylinder or piston and/or provided air pressure may be stored in the parameter dataset. Furthermore, the number of rotations of the wheel taking place during displacement of the cylinder, for example from an initial position to an end position, or during other defined displacement paths may be stored in the parameter dataset.

It may be provided that the storage unit includes a lookup table for storing the parameter dataset. Within the meaning of the present disclosure, a lookup table is understood to mean a data structure having assigned entries, which may for example be in the form of a database, in particular a relational database. A lookup table works by comparing inputted/received parameters (input) with the entries in the lookup table (output). For specific parameters, a corresponding value/entry, in particular for the position, may be provided as an output. A corresponding value can be provided efficiently and precisely. The lookup table may be created by way of a teach-in pass of the drive or gripper system. Here, a teach-in pass is understood to mean a measurement sequence with measurement points distributed over the stroke, rather than a continuous pass.

It may be provided that the stored parameter dataset is created by means of a teach-in pass of the wheel/piston arrangement. In a reference pass, the drive and/or gripper system and thus the wheel/piston arrangement moves into a defined position. The valves of the compressed air supply are actuated by means of a system stimulus. Via a defined signal or via a pressure regulator, a predetermined pressure jump can be generated. The accompanying position or movement of the drive and/or gripper system can be detected. The valve current and/or the time to achieve a target pressure after the pressure jump may be determined. The value pair consisting of the position of the drive and the measured variables (generally multifactorial) is written to a line of a lookup table. The drive and/or gripper system is minimally displaced, and the procedure can be repeated until a necessary number of data (support points) over the total displacement path have been entered into the lookup table. The lookup table may be stored in a non-volatile/permanent store of the device. After the supply voltage ceases, in other words when the position of the piston is unknown, the system stimulus used during the teach-in pass can be applied and assigned to a position via the lookup table. The assignment may take place using error squares (this corresponds to finding the closest data point). Alternatively, an arbitrary continuous trial function, for example a straight line or polynomial, may be fitted to the determined value pair in such a way that it becomes possible to calculate the position analytically from the sensor signal.

It may be provided that the parameter dataset is created in a model-based manner by evaluating a pressure oscillation and/or evaluating the mass flow and/or supplemented with results of the (aforementioned) evaluations. The periodic change in pressure in a medium, which is normally caused by a source of oscillation, may be referred to as a pressure oscillation. These may occur in various systems, in fluids, in gases or in liquids. Within the meaning of the disclosure, the mass of a substance flowing through a particular area or cross section per unit time is referred to as mass flow. Mass flow may be important in numerous systems and processes, including fluid systems such as gases or liquids. It is a parameter for monitoring and controlling processes in which a system has to transport a particular amount of material or liquid. The temperature, pressure and/or density of the material flowing through the system are factors which can affect the mass flow. By evaluating the pressure oscillation and/or the mass flow, further variables for determining the piston or wheel position can be determined. The results of the evaluation may be understood as a collection of variables and/or values which may be used for evaluation or analyses. These results serve to supply additional information, and can supplement the parameter dataset. The parameters may be numerical values, statistical indices, mathematical models and/or other variables. The parameter dataset may include results of the evaluation of the pressure oscillation and/or mass flow and/or replace existing values as an update.

It may be provided that the wheel rotational position $\varphi$ comes, via the first formula of the position calculation prescription, from a value of the wheel rotational position $\varphi$ in a position interval for the piston or wheel position and from an averaged value of the sensor signal u on the basis of the angle of rotation of the wheel. It can thus be established whether a complete rotation of the wheel has taken place for a single-turn rotary encoder.

It may be provided that the wheel rotational position $\varphi$ comes, via the first formula of the position calculation prescription, from a value of the wheel rotational position $\varphi$ in a position interval for the piston or wheel position and from a positive or negative value of the sensor signal u on the basis of the angle of rotation of the wheel. Alternatively, the following third formula 3 may be used, in particular as a specific example of a sinusoidal sensor signal:

$$\{\varphi = a \cdot \sin(b \cdot u + c) + n * 360°; b \text{ here: } b = 1, c = 0\}.$$

It can thus be established that a complete period of the sinusoidal sensor signal is available and a complete rotation of the wheel has taken place.

The solution to the object has been described herein by way of the method. Features, advantages or alternative embodiments mentioned in this context are also transferrable to the other claimed subject matters and vice versa. In other words, the tangible claims (relating by way of example to a computing unit) may also be developed with the features described or claimed in connection with the method and vice versa. In this context, the corresponding functional features of the method are formed by corresponding tangible modules, in particular hardware modules or microprocessor modules of the device. The preferred embodiments of the invention described herein in connection with the method are not explicitly repeated for the device, but may be implemented correspondingly in the device. As a basic principle, the claimed device is formed to carry out the claimed method.

A further aspect of the invention relates to a computing unit for determining a piston or wheel position. The device may be formed as or comprise a computing unit. The computing unit for determining a piston or wheel position in a pneumatic drive and/or gripper system has a wheel/piston arrangement, which has a wheel and a piston kinematically coupled to the wheel. The computing unit comprises a trigger interface for providing a trigger signal for triggering a defined system stimulus of the pneumatic drive and/or gripper system. Via the trigger interface, a signal can be provided. By means of the signal, the system stimulus can be triggered/take place. Via the trigger interface, corresponding actuators can be addressed to trigger the system stimulus. The response of the system to the system stimulus is detected. This can take place by reading in sensor signals in connection with stored values and/or assignment prescriptions. From the system response, a (rotary) position can be assigned or determined, for example via a stored assignment table (lookup table). The position determined in this way is unique (even over multiple rotations) but imprecise. Furthermore, a detection interface for detecting an angle of rotation of the wheel of the wheel/piston arrangement by way of a sensor unit is provided. The angle of rotation is detected in particular via a precise sensor unit, which, however, does not supply a unique signal over multiple rotations. The detection interface can provide communication to the sensor unit and thus detect the sensor data of the sensor unit. In addition, a receiving interface is provided, which is in communication with a storage unit and is formed to receive a parameter dataset, comprising data, in particular assignment data, for assigning the detected system response (to the triggered defined system stimulus) to a non-periodic and thus unique angular position (angle of rotation). The assignment data may for example be stored in a lookup table and/or be detected and stored from teach-in passes, which are carried out previously, in particular once at or before launch. The disclosed computing unit is intended to determine the piston or wheel position by performing a position calculation prescription. It serves to determine the result in the form of a unique, precise piston or wheel position.

The computing unit may be formed on a cloud-based server. Accordingly, it need not be arranged locally on the site of the drive and/or gripper system. In an alternative configuration, however, the computing unit may be formed locally at the drive and/or gripper system.

It may be provided that the disclosed computing unit further comprises an output interface intended to provide and/or output the determined result with the determined unique, precise piston or gearwheel position.

The position calculation may be selected or configured in such a way that no movement of the piston is brought about and/or is necessary. The pressure can be changed on both sides of the piston simultaneously. The system can be position-regulated to the current position during the calculation. In the stated configuration, there may be a linear relationship between the sensor signal and the piston/wheel position. In general, it may be found that the absolute position can be determined from the sensor signal and number of rotations combined, by the following formula:

$$\varphi = f1(u) + f2(n).$$

A pneumatic drive and/or gripper system comprising a disclosed computing unit is further provided.

The disclosure further relates to the use of the piston or wheel position, determined by the disclosed method, to actuate the pneumatic drive and/or gripper system.

The disclosure further relates to a computer program. The above-described configurations of the method may also be formed as a computer program, a computing unit (for example a computer, microcontroller, DSP, FPGA and/or SPS) being caused to carry out the method according to the invention when the computer program is executed on a computing unit or on a processor of the computing unit. The computer program may be provided as a signal for each download or be stored in a storage unit of the computing unit with computer-readable program code contained therein, so as to cause a computing unit to carry out instructions in accordance with the aforementioned method. The computer program may also be stored on a machine-readable storage medium.

An alternative solution therefore provides a storage medium, in particular a computer-readable storage medium, intended to store the disclosed method (as a program code) and readable by a computer or a processor of the computer. The program code, when executed by a processor circuit of a computer or computer network, causes an embodiment of the disclosed method to be carried out. The storage medium may for example be provided at least in part as a non-volatile data store (for example as a flash memory and/or as an SSD) and/or at least in part as a volatile data store (for example as a RAM). The storage medium may be arranged in the processor circuit in the data store thereof. However, the storage medium may also be operated as an app store server online. A processor circuit comprising at least one microprocessor may be provided by the computer or computer network.

The program code may be provided as a binary code or assembler and/or as a source code of a programming language (for example C) and/or as a program script (for example Python).

What is described above can be summarised in a paraphrased form described for one possible more specific configuration of the disclosure, but the following description should not be considered to limit the disclosure.

Two linearly movable pistons may have toothings which engage with a wheel (gearwheel with pinion) and form a wheel/piston arrangement, in particular one which operates in the manner of a toothed rod and pinion. The principle of a toothed rod and pinion can be used in pneumatic parallel grippers and rotary drives. For use in a parallel gripper, the gearwheel can be moved in rotation by moving the piston in translation, and this in turn triggers synchronous movement of the gripper jaws, which are mechanically coupled directly or indirectly to the piston. In a pneumatic rotary drive, the gearwheel may serve as a driven shaft/element, which is thus driven by the two pistons. The positive fit of the toothing can cause kinematic coupling of the linear movement of the two pistons and the rotational movement of the gearwheel. The covered displacement x of the piston can be described as a function of the angle of rotation φ and vice versa (x=f(φ); φ=f(x)).

In various applications (pre-positioning a gripper or positioning a pneumatic robot joint), knowledge of the piston position and/or the angular position of the gearwheel may be required. As a result of the provided kinematic coupling, in principle either the angle of rotation φ or the piston displacement x can be queried. Detecting the gearwheel position may be more advantageous than detecting the piston position. The same displacement measurement system may be used for construction sizes having different strokes. If magnetic field sensor elements are used, a single sensor element may be sufficient. In connection with this, there may be lower costs (than for a linear displacement measurement system, which would require a plurality of sensor elements), and a smaller required installation space is necessary, and this can facilitate integration into the drive/gripper. If the gearwheel is queried, there may be decisive drawbacks for the application. Depending on the cylinder stroke and gearwheel diameter, the gearwheel may rotate multiple times over a whole cylinder stroke. If a cost-effective single-turn magnetic field sensor element is used, the piston position can no longer be calculated uniquely from the sensor signal (the sensor signal for example has a period of) 360°. Thus far, in the prior art, either a technically much more complex and more expensive solution must be used (multi-turn rotary encoder with optical or magnetic coding, power supply via auxiliary battery to store the absolute position), or a reference pass is compulsory after a system restart.

A reference pass (for example passing into the end positions) can generally be disadvantageous. In the case of a pneumatic gripper, said gripper has to be opened or closed. This can lead to loss of a workpiece, pose a risk of injury, increase the time before usability and/or impede correct position determination if the end position cannot be reached (for example being blocked by an object). In the case of a pneumatic rotary drive, formed as a robot joint, the entire downstream kinematics would have to be moved, and this can result in similar drawbacks.

The position of a pneumatic piston in a cylinder (also a rotary vein in a pressure chamber) can be determined by various methods without a position sensor being required for this purpose. For model-based position determination, a connected valve may be actuated. The pressure change over time that sets in can be measured and calculated back to the aerated/vented volume via a physical model equation (alternatively, a change in pressure being specified and the valve position/voltage being measured). The physical model equation may be stored in a storage unit. From the volume thus calculated, the drive position can be determined (for a cylinder, merely the piston diameter must be known for this purpose). An advantage of this type of volume or position determination can be that no displacement measurement system is required. However, position determination of this type may be relatively imprecise or not sufficiently precise for servo-pneumatic applications. Typical values cannot be specified, since these can be heavily dependent on the system in question. In principle (in model-based calculation methods), model errors can affect the calculated position error (difference from position actually to be calculated).

The disclosure may comprise a method for determining the position of pneumatic pistons in pneumatic drives/grippers which operate in the manner of a toothed rod and pinion. In this context, a (for example model-based) position calculation and the sensor signal of a simple angle sensor (for example magnetic field sensor) are combined so as to determine the exact position of the pinion or wheel without a reference pass being necessary.

The sensor signal (in other words the linearised sensor voltage) u may be represented as a function of the actual angle of rotation φ of the pinion or the piston displacement x. In an interval of 0-360°, the sensor voltage can rise linearly, and then jumps to 0 to rise linearly again as the angle increases further. For a determined sensor voltage, the angle of rotation or the piston position cannot be determined uniquely. However, if it is known how often the gearwheel has rotated since leaving the end/zero position (described by the parameter n), the angle of rotation can be determined uniquely via the formula φ=k*u+n*360°, where k describes the linear relationship between φ and u, and n specifies the number of rotations completed thus far. n may be determined either via a reference pass or from a (for example model-based) volume calculation, in combination with the evaluation of the sensor voltage. Fundamentally, it can be distinguished whether or not the position interval (confidence interval) of the relatively imprecise (model-based) position calculation is at a signal jump. Specifically, the piston position/system state can be determined as follows:

In a first case: confidence interval of the position calculation lies over a signal jump:

- The number n of rotations of the wheel is determined from model-based (or other) position calculation, here n=0
- φ, x from n and u can be calculated by the specified formula.

In a second case: confidence interval of the position calculation does not lie over a signal jump: different cases must be distinguished here:

- high voltage (greater than 0.5 when normalised)→lower value of n, here n=1
- low voltage u (less than 0.5 when normalised)→higher value of n, here n=2
- φ, x from n and u can be calculated by the formula φ=k*u+n*360°.

For a sinusoidal sensor signal, it may be provided that it is distinguished whether the second zero is within the confidence interval. The case distinction for a sinusoidal sensor signal may look like this:

For the first case: confidence interval of the position calculation does not lie over a second zero: (1) n from model-based (or other) position calculation, here n=0

(2) φ, x from n and u can be calculated by the formula φ=a·sin(b·u+c)+n*360°; here: b=1, c=0

For the second case: confidence interval of the position calculation does lie over the second zero. For the case distinction:

- positive sensor signal→higher value of n, here n=1
- negative sensor signal→lower value of n, here n=0
- →w, x from n and u can be calculated by the formula φ=k*u+n*360°.

The disclosure therefore consists in combining a precise but relative angle signal (also referred to as a first angle-of-rotation signal) with imprecise but absolute angle information (also known as a second angle of rotation) to form a precise, absolute angle value. In this connection, the relative angle signal represents the angle signal being periodic, in other words not unique over a plurality of gearwheel rotations (multi-turn problem).

It may be provided that the more precise but relative angle of rotation can be determined by an angle measurement using a simple single-turn magnetic field sensor. In this context, the angle information may be (relatively) precise, but is not unique, since it is unclear what rotation the gearwheel is in the middle of.

A system stimulus and detection of the in particular position-dependent system response may be provided. After a power-off, the pneumatic system can be stimulated and the system response determined. The stimulus must be defined, and the measured response must be position-dependent.

The more imprecise but absolute angle of rotation may be calculated from the system response by deducing the system state, in other words the piston position, directly or indirectly from the intermediate response, in other words the system response. A position value determined in this manner is in general less precise, but absolute, in other words unambiguous.

A combination of the precise, relative and the imprecise, absolute angle of rotation to form the precise, absolute angle of rotation may be provided. The determined information may be combined to determine the piston/gearwheel position uniquely and to the precision of the sensor used.

Alternatively or in addition, the imprecise but absolute angle of rotation may be calculated from the physical model and a system response may be assigned back to a position. The physical model may include an evaluation of the mass flow and/or the evaluation of the pressure oscillation. The reverse assignment may take place by means of a lookup table or a formula from an experiment. The experiment is carried out repeatedly in many positions. The experiment to fill the lookup table is repeated during operation after power-off. During operation, there should preferably explicitly be no reference pass. The experiment must thus be configured in such a way that the piston does not move. This may for example be achieved by changing both pressure levels of the drive/gripper, meaning that the pressures acting oppositely on the piston are always changed symmetrically/simultaneously.

An advantageous embodiment provides the following sequence:

Step 1—Carried Out Once at Launch and Only for the Model-Free Method:

A system stimulus is performed along the entire gripper stroke, for example every 5 mm. For each system stimulus, the system response is recorded and stored in the lookup table together with the current angle of rotation. Here, this current angle of rotation is precise and absolute, since it starts in a defined manner in an end position and includes every single-turn rotation.

Step 2—Carried Out after Each Power-on:

In the position where the gripper is currently located, the system stimulus is performed. The system response to this is detected and compared with those in the lookup table. As a result, the current absolute angle of rotation is obtained, together with the relative angle of rotation. Here, the gripper is not moved.

The above configurations and developments may be combined freely with one another, within reason. Further possible configurations, developments and implementations of the disclosure also include—inter alia not explicitly mentioned—combinations of features of the disclosure which are described above or in the following. In particular, a person skilled in the art will also add individual aspects as improvements or supplements to each basic form of the present disclosure. In particular, features of the device claims may be implemented and/or carried out by way of corresponding functionalities, which accordingly supplement or expand the method. Furthermore, method steps may be implemented by way of corresponding implementation modules in the device. Thus, what has been described above in relation to the device also applies analogously to the method and vice versa.

BRIEF DESCRIPTION OF THE DRAWINGS

In the following, detailed description of the drawings, example embodiments, which are to be taken as non-limiting, are discussed, along with the features and further advantages thereof, with reference to the drawings, in which.

Figure 1:
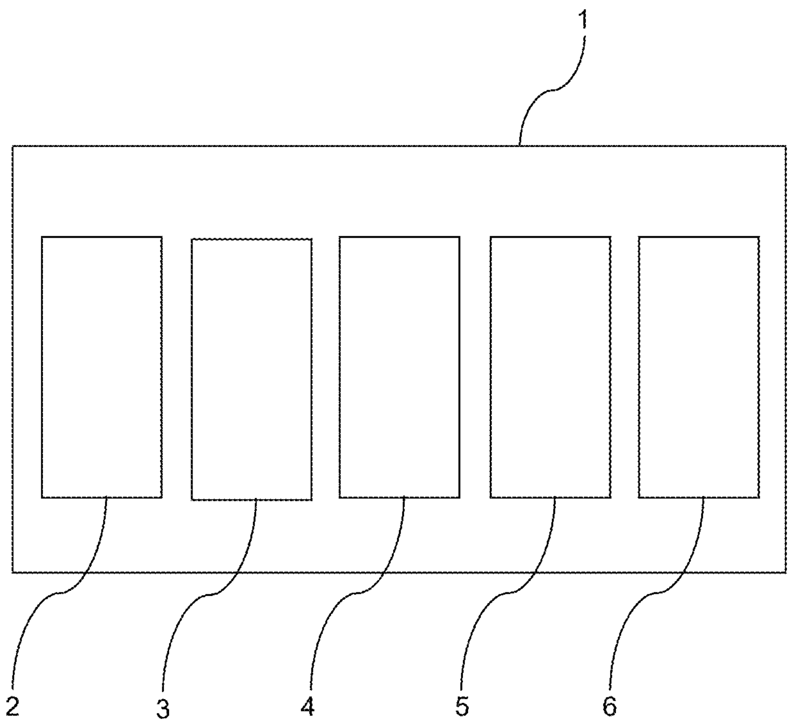
FIG. 1 is a schematic drawing of a disclosed device.

The accompanying drawings are intended to convey a deeper understanding of the development of the disclosure. They illustrate developments and serve, in conjunction with the description, to illustrate principles and concepts of the disclosure. Other developments and many of the stated advantages are apparent from the drawings. The elements of the drawings are not necessarily to scale with one another.

In the drawings, unless stated otherwise, like, functionally equivalent and equivalently operating elements, features and components are provided with like reference numerals in each case.

DETAILED DESCRIPTION

FIG. 1 is a schematic drawing of a disclosed device 1. The device may be formed as a computing unit 1. The computing unit 1 may be formed as a decentralised device. Alternatively, the computing unit 1 may be formed in a cloud-based application and communicate with the drive and/or gripper system 10 via a communication medium (not shown).

The computing unit 1 for determining a piston or wheel position in a pneumatic drive and/or gripper system 10, comprising a wheel/piston arrangement 11 (not shown) which has a wheel 12 and a piston 13 kinematically coupled to the wheel 12, comprises a plurality of interfaces for communication and/or data exchange. In particular, the computing unit 1 is for determining a result in the form of a unique (even over multiple performed rotations), precise piston or wheel position.

A trigger interface 3 is provided to supply a trigger signal for a defined system stimulus of the pneumatic drive and/or gripper system 10. The trigger interface 3 may be formed as an output interface for providing the trigger signal. Via the trigger interface 3, communication to the pneumatic drive and/or gripper system 10 comprising a wheel/piston arrangement 11 can take place. A detection interface 4 is provided to detect an angle of rotation of the wheel 12 of the wheel/piston arrangement 11 by means of a sensor unit 20. The angle of rotation is preferably detected using a precise angle-of-rotation sensor which is not unique over multiple rotations, for example in the form of a single-turn magnetic field sensor. The detection interface 4 may be formed as an input and/or output interface. Preferably, the detection interface 4 is formed as an interface to the sensor unit 20 and serves to detect or receive a sensor signal of the sensor unit, and in particular the angle of rotation of the wheel 12 of the wheel/piston arrangement 11. A communication/data connection to the sensor unit 20 can be constructed. The sensor unit 20 can thus be set and/or calibrated. The detection interface 4 may be formed for wired or wireless communication. The detection interface 4 may be formed as a USB, Ethernet, HDMI, Bluetooth, WLAN and serial interfaces such as RS-232 or RS-485. The trigger interface 3 may be formed analogously or in a corresponding manner to the detection interface 4. Furthermore, a receiving interface 5 is provided, which is in communication with a storage unit 2 so as to receive a parameter dataset. The parameter dataset comprises data (assignment data) which make it possible to assign the detected system response to the triggered system stimulus (imprecisely but uniquely) to a non-periodic and thus unique position.

The storage unit 2 may be formed as an internal storage unit. Alternatively, it may be provided that the storage unit 2 is formed as an external storage unit and communicates with the computing unit 1 via a communication medium. In the storage unit 2, a data structure or a database for storing the parameter dataset may be stored. The storage unit 2 may provide a lookup table for storing the parameter dataset. The computing unit 1 is intended to determine a result in the form of the piston or wheel position by performing a position calculation prescription. In this context, a unique but imprecise angular position is determined or calculated, as an intermediate result, from the determined system response and the received parameter dataset. The determined intermediate result is subsequently merged or combined with the determined periodic, non-unique angle-of-rotation signal so as to supply the result.

The position calculation prescription may be performed by a processor unit of the computing unit 1.

The computing unit 1 may further comprise an output interface 6. The output interface 6 is intended to provide and/or output the determined piston or gearwheel position (result). The output interface 6 may be in communication with the drive and/or gripper system 10 via a communication medium, so as to supply the determined piston or gearwheel position to further processing and/or use, in particular control and/or regulation of the drive and/or gripper system 10. Furthermore, the control interface 6 may be in communication with an output unit via a communication medium. The output unit may be formed as a monitor, display, touchscreen or handheld. The determined piston or gearwheel position may be outputted to a user on the display unit.

Via the receiving interface 5, an input appliance (not shown) may be communicatively connected to the computing unit 1. Via the input device, the parameter dataset can be supplied. Preferably, however, the parameter dataset is received from the sensor unit 20 automatically via the receiving interface. The sensor signal detected by the sensor unit 20 may be provided as a signal and be received at the receiving interface 5 when already in a prepared form.

By means of the disclosed computing unit 1 (processor unit), by combining a positioning calculation with the position calculation prescription of the first formula 1: $\{\varphi=F(u, n)=k*u+n*360°\}$ and an evaluation of a sensor signal, the wheel position and piston position can be determined uniquely without a reference pass. The piston position is implicit from the wheel position and the second formula 2: $\{x=(\pi\cdot D/360°)*\varphi\}$.

Figure 2:
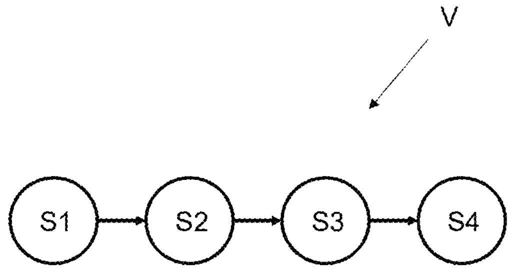
FIG. 2 is a flow chart of a disclosed method.

FIG. 2 is a flow chart of a disclosed method. The method V for determining a piston or wheel position in a pneumatic drive and/or gripper system 10, which includes a wheel piston arrangement 11 having a wheel and a piston 13 coupled to the wheel 12, includes a plurality of method steps in the embodiment shown.

In a first method step S1, there may be a defined system stimulus of the pneumatic drive and/or gripper system 10. The system stimulus may be supplied by the computing unit 1. The system stimulus may be based on the external effect or input exerted on the drive and/or gripper system 10 to achieve a desired movement or reaction. There may be a mechanical, electric, pneumatic, hydraulic and/or sensor-based stimulus. The system response to the performed system stimulus is detected. The later calculation from the system response results in an absolute, in other words unique, value.

In a second method step S2, an angle of rotation of the wheel 12 of the wheel/piston arrangement 11 is detected. It is detected by means of an angle-of-rotation sensor, for example a single-turn magnetic field sensor. The detected angle of rotation of the wheel 12 may be a periodically progressing, non-unique but precise sensor signal. It is detected by a first sensor unit 20. The sensor unit 20 may, as noted above, be formed as a single-turn rotary encoder. The sensor unit 20 is formed to be able to detect the coordinate directions perpendicular to the axis of rotation in an orthogonal coordinate system of the components of the magnetic field. It may be provided that the sensor unit 20 interacts with a magnet 21. The magnet 21 may have diametric or multipole magnetisation. The magnet 21 may be formed as a diametrically magnetised disc magnet or as a diametrically magnetised ring magnet. A sensor signal of period 360° may be supplied. Alternatively, each magnet which generates a rotating magnetic field when rotated may be used. The magnetic field need not necessarily be of period 360°. The measurement can also be implemented if a magnetic field of period 180° is generated (by a magnet magnetised N/S/N/S). In this case, the system state is determined precisely to a half rotation or 180° by the pneumatic (optionally model-based) position determination (in combination with the sensor signal). The parameter dataset is supplied correspondingly.

In a further method step S3, a parameter dataset is received. The method step S3 may also alternatively be performed before the method step S2. This preferably takes place via the receiving interface 5. The parameter dataset may characterise at least one piston 13, in particular as regards its functionality in the wheel/piston arrangement 11. The parameter dataset may include different parameters of the piston 13 of the wheel/piston arrangement 11 of the pneumatic drive and/or gripper system. The parameter dataset may for example comprise an operating state, actuation signals, a working volume, working pressures and/or the shape of the piston. The parameter dataset may be stored in the storage unit 2 as a lookup table.

Alternatively or in addition, the parameters of the lookup table may be determined by way of a learning pass.

The pneumatic cylinder includes the piston 13. The pneumatic cylinder may, depending on the embodiment, have a first and a second pressure chamber. A pressure may be applied to the first and/or the second pressure chamber. A pressure jump (as a system stimulus) may be specified. The time to achieve the desired target pressure may be measured. The correspondingly determined value pair may be transferred into the lookup table. The time to achieve the target pressure may be entered for a rising position. As a result, a reverse assignment can be made possible during operation.

In a further method step S4, the piston or wheel position is determined by performing a position calculation prescription. The position calculation prescription determines an intermediate result, in the form of a non-periodic, unique but imprecise angle of rotation, from the detected system response using the received parameter dataset. The position calculation prescription further serves to combine the intermediate result with the periodic, non-unique but precise angle-of-rotation signal of the sensor. A first formula 1 may be applied: $\{\varphi=k*u+n*360°\}$. The position calculation prescription may be converted by a program into program code. The parameter k denotes the linear relationship between the rotational position φ in degrees and the sensor signal, where, in the first formula, the sensor signal is represented as u, n represents the number of completed rotations of the wheel 12, and n is determined from the parameter dataset. Optionally, n may be determined in combination with the sensor signal u. This is advantageous if the confidence interval lies over the signal jump. With the first position calculation prescription, by using the first formula, the wheel position of the wheel at a particular time in the performance of the drive and/or gripper system 10 and number of rotations can be supplied.

In addition or alternatively, the piston position of a cylinder piston of the wheel/piston arrangement 11 may also be determined as follows. The piston position can be determined by performing the position calculation prescription, the position calculation prescription comprising a second formula 2: $\{x=(\pi\cdot D/360°)*\varphi\}$, where x denotes the piston position, D the effective diameter of the wheel 12, and φ the rotational wheel position in degrees. With the second formula, the translational piston position can be determined from the determined angle of rotation.

The determined piston or wheel position may optionally, in a further step, also be outputted and/or used for control or other processing.

Figure 3:
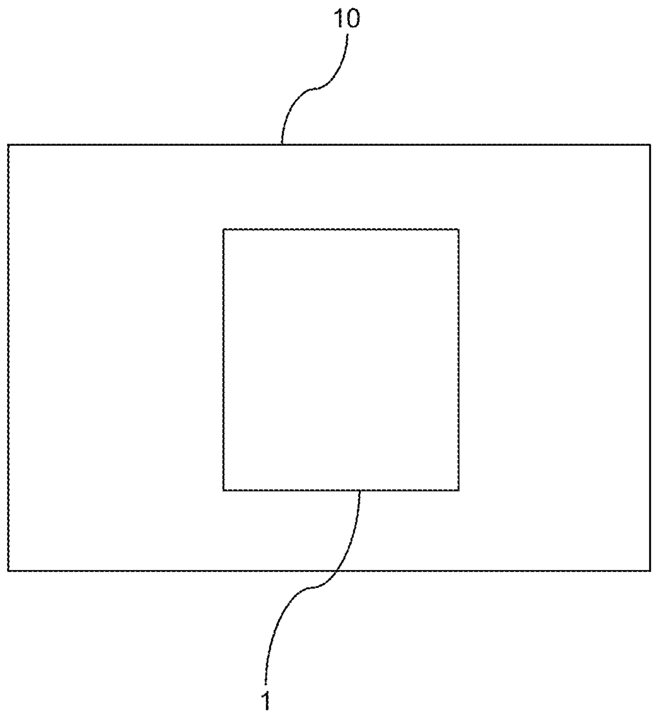
FIG. 3 is a schematic drawing of a disclosed drive and/or gripper system.

FIG. 3 is a schematic drawing of a disclosed drive and/or gripper system. Reference sign 10 denotes the drive and/or gripper system. The drive system may be formed as a pneumatic rotary drive. The gripper system may be formed as a gripper system for gripping applications, two grippers or gripper jaws being driven via at least one cylinder. The drive and/or gripper system 10 comprises the disclosed computing unit 1. Alternatively, the computing unit 1 may be formed as an external unit (not part of the drive and/or gripper system 10) and be communicatively connected to the drive and/or gripper system 10 via a communication medium.

Figure 4:
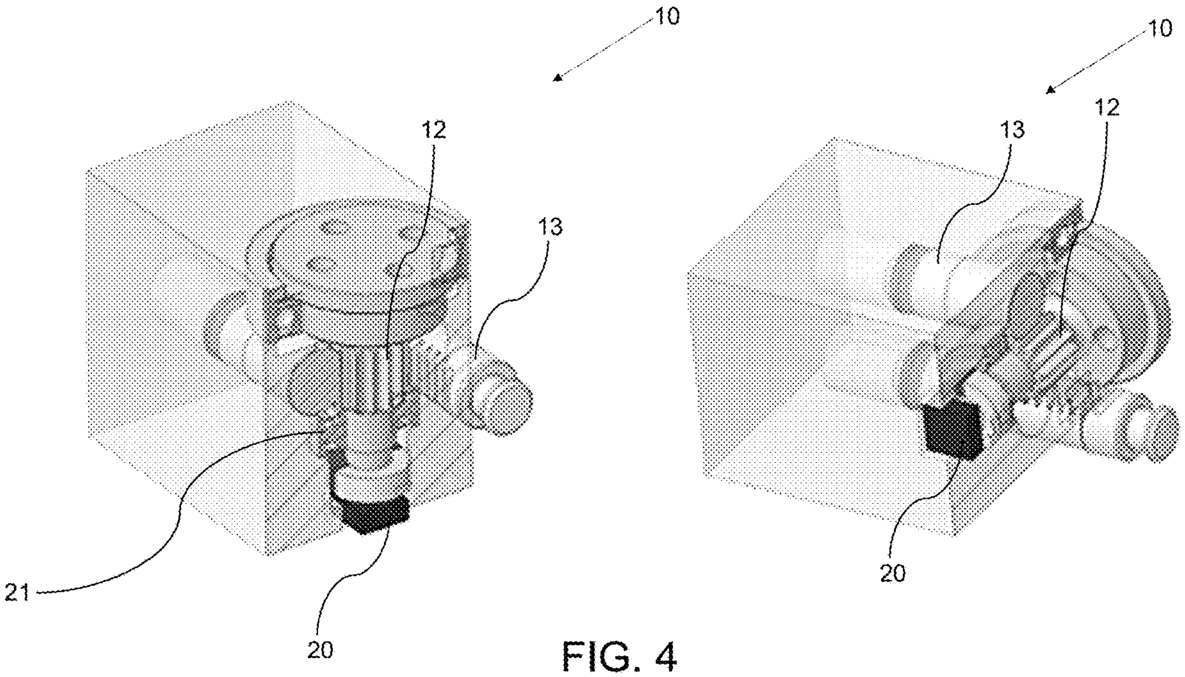
FIG. 4 is a further schematic drawing of a disclosed drive and/or gripper system.

FIG. 4 is a further schematic drawing of a disclosed drive and/or gripper system 10. In the embodiment shown, the drive and/or gripper system 10 comprises a wheel/piston arrangement 11 comprising two pistons 13. The wheel/piston arrangement 11 further comprises a wheel 12. In the embodiment shown, the wheel 12 is formed as a gearwheel. A magnet 21 is placed on the wheel 12 and/or on the shaft of the wheel 12. A sensor unit 20 is placed precisely on the axis of rotation of the magnet 21, in an on-axis configuration. Alternatively, it may be provided that the sensor unit 20 is not positioned on the axis of rotation of the magnet 21. An off-axis configuration may thus also be provided.

Figure 5:
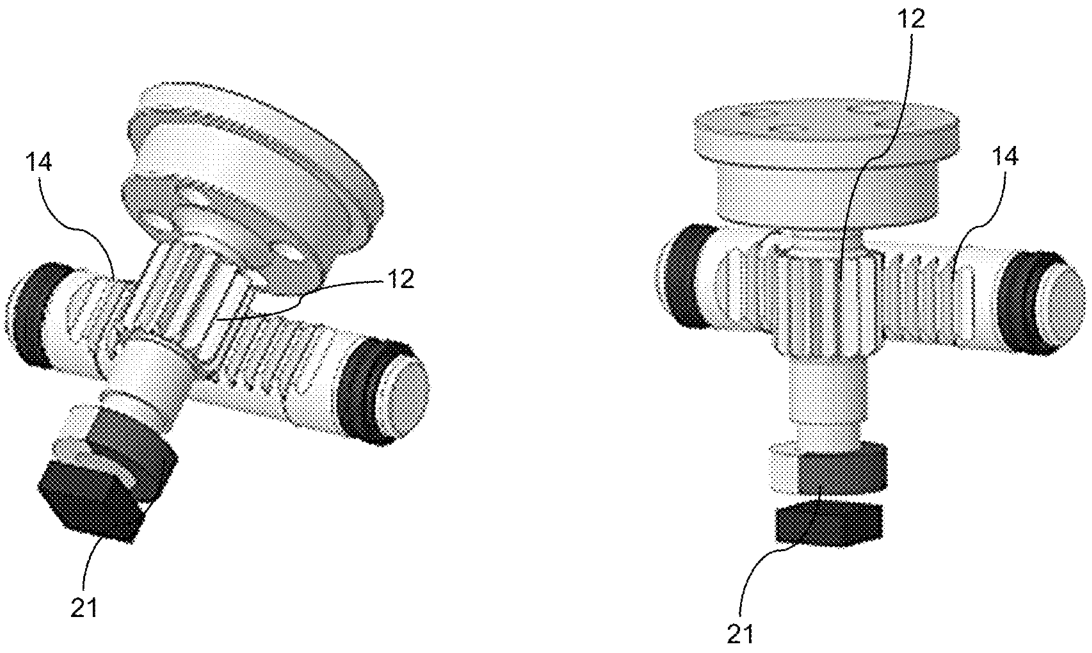
FIG. 5 shows a wheel/piston arrangement of a disclosed drive and/or gripper system.

FIG. 5 shows a wheel/piston arrangement 11 of a disclosed drive and/or gripper system 10. FIG. 5 shows an embodiment comprising a pneumatic piston 13. The pneumatic piston 13 is connected to a toothed rod 14. The pneumatic piston 13 performs a translational movement. The wheel 12 is engaged with the toothed rod 14. For this purpose, the wheel 12 is formed with a toothing for kinematic coupling. The movement of the pneumatic piston 13 rotates the wheel 12. A magnet 21 is rigidly connected to the wheel 12 and thus rotates in a manner corresponding to the movement of the wheel 12. A sensor unit 20 (not shown) may be fixed near the magnet 21. The change in the magnetic field during the rotation of the magnet 21 can be detected by the sensor unit 20.

Figure 6:
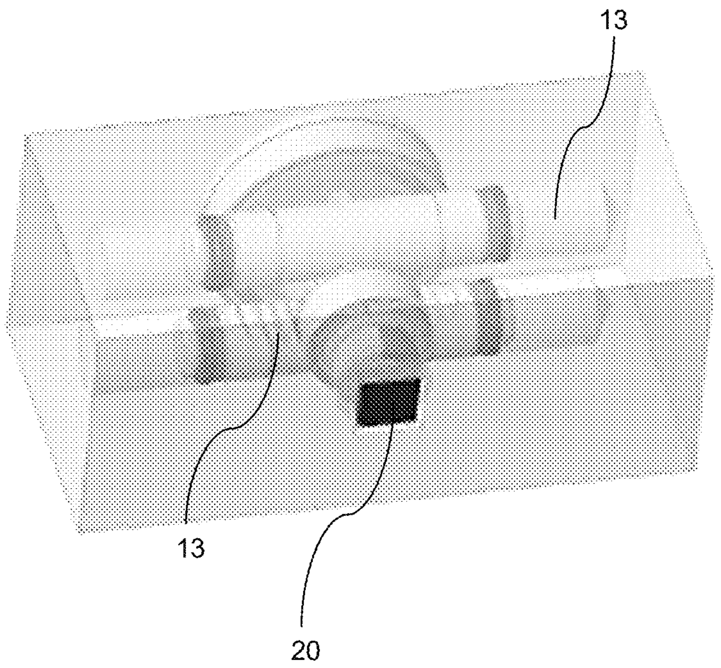
FIG. 6 is a further schematic drawing of a disclosed drive and/or gripper system.

FIG. 6 is a further schematic drawing of a disclosed drive and/or gripper system 10. In the embodiment shown, the drive and/or gripper system 10 has two pneumatic pistons. The two pneumatic pistons have a kinematic coupling to the wheel, formed as a gearwheel. The positive fit of the toothing establishes the kinematic coupling of the linear movement of the two pistons and the rotational movement of the gearwheel. The covered displacement x of a piston is therefore a function of the angle of rotation φ and vice versa (x=f(φ); φ=f(x)). The rotational movement of the wheel is detected via the sensor unit 20. As a result of the established kinematic coupling, the angle of rotation φ and the piston displacement x can be determined.

Figure 7:
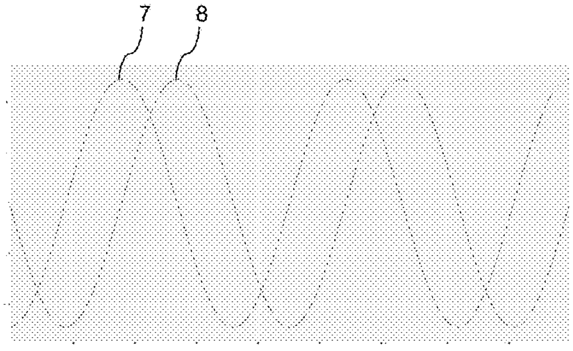
FIG. 7/8 show a sensor signal for use with a disclosed computing unit.

FIG. 7 shows a sensor signal for use with a disclosed device. The sensor signal shown in FIG. 7 shows the measurement of the x- and y-components of the magnetic field of the magnet 21 by way of the angle of rotation. In this context, the first oscillation 7 shows the x-component and the second oscillation 8 shows the y-component of the magnetic field.

Figure 8:
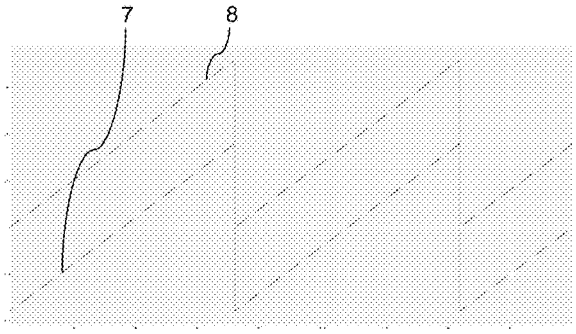

FIG. 8 shows a sensor signal for use with a disclosed device. The sensor signal shown in FIG. 8 shows the processed sensor signal by way of the angle of rotation. In this context, the first oscillation shows arctan (x-component/y-component) and the second oscillation 8 shows the oscillation additionally with a shifted zero point. This results in a sensor signal u, linear in portions, as a function of the angle of rotation φ of the wheel 12. Through a combination of the position calculation and evaluation of the sensor signal u, the angle of the wheel 12 can be determined uniquely without a reference pass.

Figure 9:
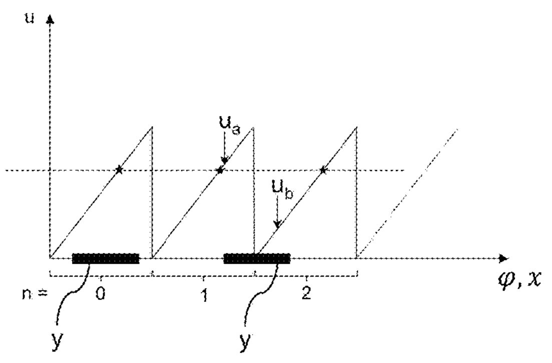
FIG. 9/10 show a further sensor signal for use with a disclosed computing unit.

FIG. 9 shows a further sensor signal for use with a disclosed device. FIG. 9 shows a sensor signal u, linear in portions, as a function of the angle of rotation φ of the wheel 12. Through a combination of position calculation using the parameter dataset and evaluation of the sensor signal u, the gearwheel angle can be determined uniquely without a reference pass. The sensor signal u may be outputted as a voltage or current. In FIG. 9, the sensor signal u is plotted against the angle of rotation φ and the translational movement x. The translational movement x results from the further calculation using formula 2 of the position calculation prescription. The sensor signal u is a periodically repeating signal. Using the first formula of the position calculation prescription, the rotational wheel position φ comes from a value of the rotational wheel position φ in a position interval y for the piston or wheel position and from an averaged value of the sensor signal on the basis of the angle of rotation of the wheel 12.

The position interval y (confidence interval) basically serves to distinguish whether or not the wheel 12 has performed a full rotation. The position interval y represents a statistical measure specifying how probable it is that an estimated value is within a particular range. The position interval can be defined as a range within which there is a particular probability (the confidence level) of the estimated value being contained.

Fundamentally, it can be decided whether or not the confidence interval of the relative position calculation lies over a change to another period (signal jump). Specifically, the wheel or piston position or the system state can be determined by distinguishing two cases.

If, in a first case, the confidence interval of the position calculation does not lie over a signal jump, the number n of rotations of the wheel 12 is taken from the parameter dataset. In the embodiment shown in FIG. 9, n=0. The piston or wheel position φ, x is determined from n and u using the position calculation prescription of formula 1 and x is determined using formula 2.

If, in a second case, the confidence interval of the position calculation lies over a signal jump, it is necessary to distinguish between a high voltage and a low voltage resulting from the averaged value of the sensor signal u. A high voltage $u_a$ of the sensor signal (greater than 0.5 when normalised) results in a lower value of n. A low voltage $u_b$ (less than 0.5 when normalised) results in a high value of n. In FIG. 9, this results in n=2. The piston or wheel position φ, x is determined from n and u using the position calculation prescription of formula 1 and x is determined using formula 2.

Figure 10:
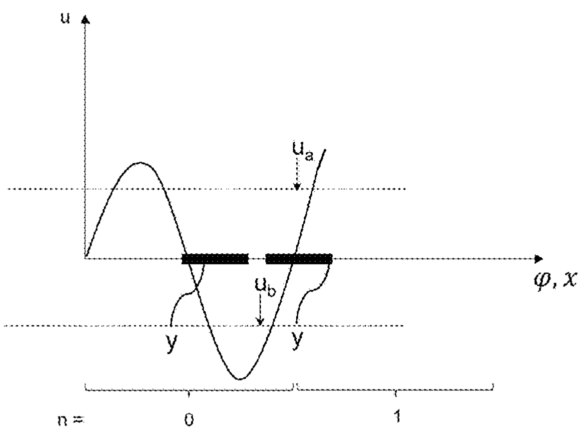

FIG. 10 shows a further sensor signal for use with a disclosed device. For a sinusoidal sensor signal, it is necessary to distinguish whether the second zero crossing is within the confidence interval. For a sinusoidal sensor signal, the case distinction described for implementing a function which is linear in portions comprises the following calculation.

If, in a first case, the confidence interval of the position calculation does not lie over a second sensor signal value of 0 (voltage=0V) (zero crossing), the number n of rotations of the wheel 12 is taken from the parameter dataset. In the embodiment shown in FIG. 10, n=0. The piston or wheel position φ, x is determined from n and u via a position calculation prescription for sinusoidal signals according to formula 3: $\varphi=a\cdot\sin(b\cdot u+c)+n*360°$; here: b=1, c=0 and x is determined using formula 2.

If, in a second case, the confidence interval of the position calculation does lie over a second sensor signal value of 0 (voltage=0V) (zero crossing). A positive voltage $u_a$ of the sensor signal results in a high value of n. In FIG. 10, this results in n=1. A negative voltage up results in a low value of n. In FIG. 10, this results in n=1. The piston or wheel position φ, x is determined from n and u using the position calculation prescription of formula 3, and x is determined using formula 2.

Thus, no reference pass is required after a power supply failure. Furthermore, the use of an (expensive) multi-turn rotary encoder is not necessary. Thus, the drawbacks associated with a reference pass or with the use of a multi-turn rotary encoder are also eliminated. Nevertheless, an exact (precise) position φ, x, which is also unique over multiple rotations, can be determined for the wheel position and the piston position.

Finally, it should be noted that, as a basic principle, the description of the invention and the example embodiments are not to be taken as limiting with a view to a particular physical implementation of the invention. All features explained and shown in connection with individual embodiments of the invention may be provided in a different combination within the inventive subject matter so as to implement their advantageous effects simultaneously.

The scope of protection of the present invention is specified by the claims, and is not limited by the features explained in the description or shown in the drawings.

REFERENCE NUMBERS

1 Computing unit
2 Storage unit
3 Trigger interface
4 Detection interface
5 Receiving interface
6 Output interface
10 Drive and/or gripper system
11 Wheel/piston arrangement
12 Wheel
13 Piston
14 Toothed rod
20 Sensor unit
21 Magnet
V Method
S1-S3 Method steps
Y Position interval
$u_a$, $u_b$ Voltage

The invention claimed is:

1. A method for determining a piston or wheel position in a pneumatic drive and/or gripper system, comprising a wheel/piston arrangement which has a wheel and a piston kinematically coupled to the wheel, comprising: triggering a defined system stimulus of the pneumatic drive and/or gripper system and detecting a system response as a reaction to the triggered defined system stimulus; detecting an angle of rotation of the wheel of the wheel/piston arrangement as a periodic, non-unique angle-of-rotation signal by means of a sensor unit; receiving a parameter dataset, comprising data which enable assignment of the system response detected in each case to a non-periodic, unique angle-of-rotation signal of the wheel of the wheel/piston arrangement; determining the piston or wheel position, as a result, by performing a position calculation prescription, a unique angle of rotation being determined from the detected system response and the received parameter dataset as an intermediate result, and the intermediate result being compared against the periodic, non-unique angle-of-rotation signal of the sensor unit.

2. The method according to claim 1, wherein the parameter dataset is received via an input interface and/or from a storage unit.

3. The method according to claim 2, wherein the storage unit includes a lookup table for storing the parameter dataset.

4. The method according to claim 2, wherein the parameter dataset is created via a learning pass of the wheel/piston arrangement.

5. The method according to claim 1, wherein the method further comprises:

supplying and/or outputting the determined piston or wheel position.

6. The method according to claim 1, wherein the sensor unit comprises at least one single-turn rotary encoder.

7. The method according to claim 1, wherein the sensor unit interacts with a magnet and/or wherein the sensor unit is formed as or comprises a single-turn magnetic field sensor, the magnetic optionally having diametric or multi-pole magnetisation.

8. The method according to claim 1, wherein the position determination prescription comprises a first formula 1: $\{\varphi=F(u,n)=k*u+n*360°\}$, where k denotes the relationship, in particular the linear relationship, between the wheel rotational position $\varphi$ in degrees and the sensor signal, the sensor signal being represented as u in the formula, n representing the number of completed rotations of the wheel, and it being possible to determine n from the parameter dataset.

9. The method according to claim 1, wherein, in the pneumatic drive and/or gripper system, the piston position is determined by performing the position calculation prescription, the position calculation prescription comprising a second formula 2: $\{x=(\pi \cdot D/360°)*\varphi\}$, where x denotes the piston position, D denotes the effective diameter of the wheel, and $\varphi$ denotes the wheel rotational position in degrees.

10. The method according to claim 9, wherein the rotational wheel position $\varphi$ comes, via the first formula of the position calculation prescription, from a value of the wheel rotational position $\varphi$ in a position interval for the piston or wheel position and from an averaged value of the sensor signal u on the basis of the angle of rotation of the wheel.

11. The method according to claim 9, wherein the wheel rotational position $\varphi$ comes, via the first formula of the position calculation prescription, from a value of the wheel rotational position $\varphi$ in a position interval for the piston or wheel position and from a positive or negative value of the sensor signal u on the basis of the angle of rotation of the wheel.

12. The method according to claim 1, wherein the parameter dataset includes parameters of the piston of the wheel/piston arrangement of the pneumatic drive and/or gripper system, comprising at least an operating state, actuation signals, working volumes, working pressures and/or geometry of the piston.

13. The method according to claim 1, wherein the parameter dataset is model-based and in particular created by evaluating a pressure oscillation and/or evaluating the mass flow and/or supplemented with parameters of the evaluation.

14. Use of the piston or wheel position determined by the method according to claim 1 to actuate the pneumatic drive and/or gripper system.

15. A computer program, wherein the computer program can be loaded to a storage unit of a computing unit and includes program code portions for causing the computing unit to carry out the method for determining a piston or wheel position in a pneumatic drive and/or gripper system according to claim 1 when the computer program is executed in the computing unit.

16. The method according to claim 1, wherein the sensor unit is an angle-of-rotation sensor, the angle-of-rotation sensor being a single-turn magnetic field sensor, and wherein the intermediate result is an imprecise immediate result.

17. A computing unit for determining a piston or wheel position in a pneumatic drive and/or gripper system, comprising a wheel/piston arrangement which has a wheel and a piston kinematically coupled to the wheel, the computing unit being formed to perform the method according to claim 1, comprising:

a trigger interface for supplying a trigger signal for a defined system stimulus of the pneumatic drive and/or gripper system, the computing unit being intended to detect a system response as a reaction to the triggered defined system stimulus;

a detection interface for detecting an angle of rotation of the wheel of the wheel/piston arrangement as a periodic, non-unique signal by means of a sensor unit;

a receiving interface, for receiving a parameter dataset, comprising data which enable assignment of the system response detected in each case to a non-periodic, unique angle-of-rotation signal of the wheel of the wheel/piston arrangement;

wherein the computing unit is intended to determine the piston or wheel position by performing a position calculation prescription and to provide a result, a unique angle of rotation being determined from the detected system response and the received parameter dataset as an intermediate result, and the intermediate result being compared against the periodic, non-unique angle-of-rotation signal of the sensor unit.

18. The computing unit according to claim 17, wherein the computing unit further comprises an output interface intended to provide and/or output the result with the determined piston or gearwheel position.

19. A pneumatic drive and/or gripper system comprising the computing unit according to claim 17.

20. The computing unit of claim 17, wherein the sensor unit is an angle-of-rotation sensor, the angle-of-rotation sensor being a single-turn magnetic field sensor, wherein the receiving interface is in communication with a storage unit, and wherein the intermediate result is an imprecise immediate result.

* * * * *